Nov. 15, 1955     B. WASILEWSKI     2,723,457
LINE HOLDER
Filed Jan. 9, 1953
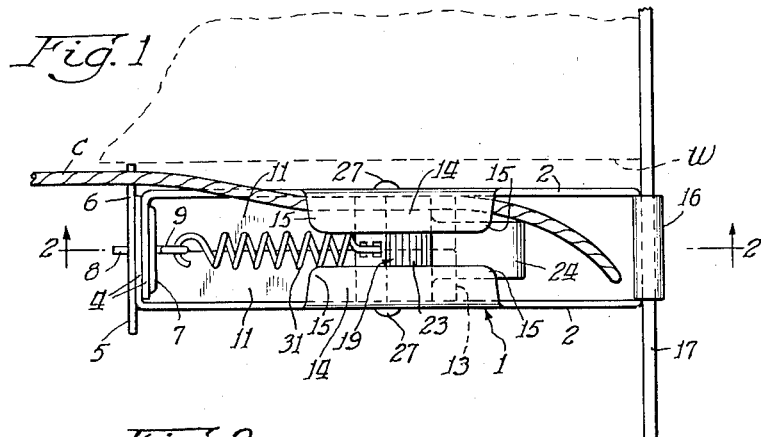
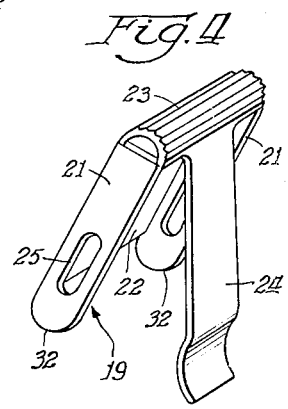
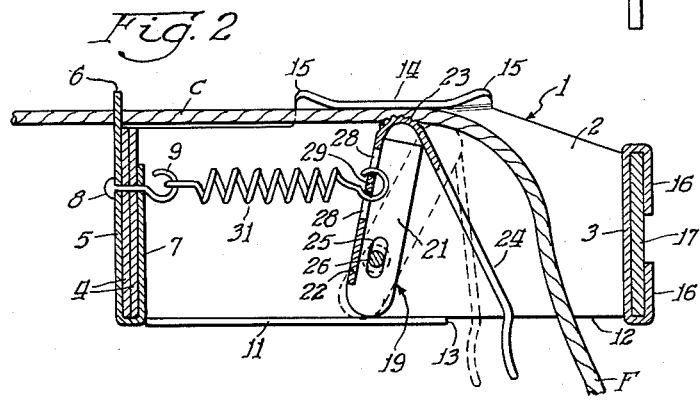
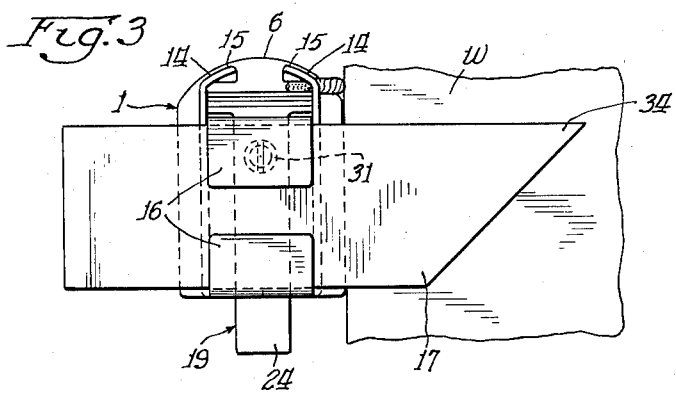
Inventor:
Bruno Wasilewski
By: Hiee & Hiee
Attys.

United States Patent Office 2,723,457
Patented Nov. 15, 1955

2,723,457

LINE HOLDER

Bruno Wasilewski, Palos Park, Ill.

Application January 9, 1953, Serial No. 330,554

6 Claims. (Cl. 33—85)

The invention relates generally to line holders, and more particularly to a line holder especially adapted for holding mason's guide lines and the like.

In the past, masons, bricklayers, and the like, usually set their cords or lines utilized to indicate the wall line by means of nails, holders or other objects which are driven into the wall or similar supporting structure. Oftentimes the line is held in place merely by securing it to nails driven into the wall proper, and as such lines have a tendency to stretch and sag, it is usually necessary to occasionally retension the line. In such cases this requires untying the line from the nail, suitably tensioning it and retying, all of which takes time. Where some form of holder or the like has been employed, such holder likewise usually has been supported directly from the wall by driving the same into the wall structure. It will be apparent that when such holder is partially driven into a wall, the line normally will be positioned a short distance away from the plane of the wall rather than directly in such plane, which would be the preferable position to insure accurate results.

The present invention therefore has among its objects the production of a holder which is so designed that the cord or line is positioned substantially at the wall surface and which does not require driving into the wall or other supporting object, at the same time permitting the line to be quickly and easily adjusted to provide the desired amount of tension thereon at all times.

Another object of the invention is the production of such a holder which is so designed that it may be readily constructed from inexpensive sheet material, having a minimum of moving parts and which is very efficient and durable in use.

A further object of the invention is the production of such a line holder which is so designed that it is more or less foolproof, whereby it will properly function at all times and with lines or cords of different types, and in which the line may be readily released when desired.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings, wherein like reference characters indicate like or corresponding parts:

Fig. 1 is a top plan view of a holder embodying the present invention;

Fig. 2 is a sectional view taken approximately on the line 2—2 of Fig. 1;

Fig. 3 is an end elevational view illustrating the holder in use; and

Fig. 4 is a perspective view of the wedge or locking member utilized.

Referring to Figs. 1, 2 and 3, the reference character 1 generally indicates a body structure illustrated in the present embodiment of the invention as being formed from a single piece of sheet metal which is bent intermediate its ends to form a pair of side walls 2 connected by an end wall 3. The opposite ends of the side walls 2 are provided with overlying flanges 4. Secured to the flanges 4 is a generally rectangular end wall or member 5 which, as illustrated in Fig. 2, is generally U-shaped in cross section, having an inner wall portion 7 whereby the flanges 4 are positioned between the wall 5 and the wall 7 carried thereby, with the respective elements being rigidly secured together by a rivet 8 or the like, the inner end of which terminates in a hook portion 9.

Extending inwardly from the respective lower edges of side walls 2 are a pair of aligned flanges 11 which cooperate to form the bottom of the body structure, and referring to Fig. 2, it will be noted that the flanges 11 do not extend completely along the bottom of the body structure thereby leaving an opening 12 between the end wall 3 and the rear edges 13 of the flanges 11. Extending inwardly from the upper edges of the respective side walls 2 are a pair of opposed ears or flanges 14, the intermediate portions of which extend generally horizontally, with the end portions turned upwardly as indicated at 15. The end wall 3 is provided with a pair of opposed lugs 16 adapted to receive and support a mounting plate or member indicated generally by the numeral 17, the latter being free to longitudinally slide between the lugs 16, whereby the body structure 1 may be adjusted longitudinally along the member 17.

Positioned between the side walls 2 below the locking ears or flanges 14 is a wedge member indicated generally by the numeral 19, the latter, in the embodiment of the invention illustrated, likewise being formed from suitable sheet material bent or otherwise shaped to provide a pair of opposed side wall portions 21 connected by an intermediate portion 22, the latter having a curved or rolled portion 23. Extending downwardly from the rear edge of the rolled portion 23 is a releasing lever 24. The side wall portions 21 or the member 19 are provided with respective aligned slots 25 therein adapted to receive a horizontally extending pin 26 secured at its ends to the side walls 2, as for example, by heads 27 formed thereon.

Referring to Fig. 2, it will be noted that the slots 25 are positioned in the lower portions of the respective side walls 21, whereby the lower end of the member 19 is restricted as to longitudinal movement relative to the body structure 1, the slots, however, permitting the wedge member 19 to have a limited amount of movement in the direction of the slots. The intermediate portion 22 adjacent the upper end of the wedge member 19 is provided with a pair of apertures 28 therein which are substantially vertically aligned to form a cross bar therebetween by means of which one end of a tension spring 31 may be connected, the opposite end of the spring 31 being engaged with the hook 9 on the rivet 8.

It will be apparent from the above described construction that upon the positioning of a cord C or the like between the rolled edge 23 of the member 19 and the lower face of one of the flanges or ears 14, the spring 31 will tend to rotate the upper edge of the member 19 in a counterclockwise direction, as viewed in Fig. 2, whereby the cord or line is clamped between the member 19 and the flange or ears 14 with the lower rounded edges 32 of the member 19 engaging the bottom of the body structure formed by the inwardly extending flanges 11. Thus the member 19 tends to become wedged between the flanges 14 and the bottom 11, thereby exerting considerable clamping force on the cord C. As illustrated in Figs. 1 and 2, the tensioned portion c of the cord C extends from the flange 14 beneath which it passes over the arcuate edge 6 of the front wall 5, with the curvature of the latter urging the tensioned cord outwardly with respect to the body structure toward the vertical surface of the wall W or other object on which the device is to be used. The free end F of the cord C may extend through the opening 12 as illustrated in Fig. 2 or may pass over the end wall 3 as desired. As the arcuate edge 6 urges the tensioned portion of the cord C outwardly into close proximity with the wall surface, the device may be normally used by engaging the member 17 with a portion of the wall surface extending at right angles to the direction of the cord C without the necessity of driving the member 17 into the wall proper, as the tensioned cord will exert a straight pull at right angles to the member 17 and thus firmly retain the holder in position solely by means of friction between the member 17 and the structure. The member 17, however, may be provided with a point 34 to permit the same to be driven into a wall when required or desired.

In use the opposite end of the cord C is suitably fastened to the wall or other supporting object and the free end brought under one of the flanges 14, this being accomplished by moving the releasing lever 24 to the position illustrated in dotted lines in Fig. 2, whereby the cord may be readily positioned between the edge 23 of the member 19 and the lower surface of the flange 14. The member 17 is then engaged with a surface extending at right angles to the plane of the wall and the free end of the cord is drawn to tension the body of the cord along the wall line, such cord tension normally providing sufficient force to maintain the holder in operative position. When desired additional tension may be put on the cord by drawing on the free end to draw additional cord beneath the flange 14. As the member 17 is freely slidable between the lugs 16, the member 17 may be readily reversed with respect to the body structure 1, whereby either of the flanges 14 may be utilized, depending upon the manner of application to the particular wall. Consequently, it is not necessary to exercise any care in setting up the line as the cord may run in either direction from the point of securement to the wall, with the holder merely being reversed as required.

It will be noted from the above description that as the member 19 bears on the bottom of the body structure 1, no clamping stresses are exerted on the pin 26, the latter merely taking the stresses resulting from the tension spring 31. Likewise, it will be apparent that the wedging action produced, while holding a line securely in the desired position may be readily released without danger of jamming or sticking.

It will be apparent from the above description that I have provided a novel line holder which is exceedingly simple in construction, inexpensive to manufacture and very efficient in operation.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. In a line holder, the combination of a body structure having a projection thereon, releasable means cooperable with said projection for clamping a line therebeneath, means having an upper edge portion longitudinally spaced from said projection and inclined inwardly from the side of the body structure for urging a line engaged therewith laterally to adjacent a side face of the body structure and transversely extending means at the longitudinally opposite side of said projection longitudinally constructed for engagement with a wall structure to support the holder therefrom.

2. In a line holder, the combination of a hollow body structure having a bottom wall, side and end walls, a longitudinally extending flange carried by one of said side walls at the upper edge thereof and extending inwardly therefrom adapted to engage a line positioned therebeneath, a wedge member positioned in said body structure, means restricting movement of said wedge member, said wedge member being of a length to be wedged between said bottom wall and a line positioned beneath said flange, whereby such a line is clamped to said body structure, spring means operative to urge said member in a wedging direction, means spaced from said flange for urging a tensioned line engaged therewith laterally to adjacent a side face of the body structure and means at the opposite side of said flange extending transversely with respect to such a flange constructed for engagement with a wall structure to support the holder therefrom.

3. In a line holder, the combination of a hollow body structure having a bottom wall, side and end walls, a longitudinally extending flange carried by one of said side walls at the upper edge thereof and extending inwardly therefrom adapted to engage a longitudinally extending line positioned therebeneath and extending over and engaging with the upper edge of an adjacent end wall, a wedge member positioned in said body structure, means restricting movement of said wedge member with respect to the body structure, said wedge member being of a length to be wedged between said bottom wall and a line positioned beneath said flange, whereby such a line is clamped to said body structure, and spring means operative to urge said member in a wedging direction.

4. In a line holder, the combination of a hollow body structure having a bottom wall, side and end walls, a longitudinally extending flange carried by one of said side walls at the upper edge thereof and extending inwardly therefrom adapted to engage a line positioned therebeneath, said flange terminating at a point longitudinally spaced from one end of the body structure, a wedge member positioned in said body structure, means restricting movement of said wedge member with respect to the body structure, said wedge member being of a length to be wedged between said bottom wall and a line positioned beneath said flange, whereby such a line is clamped to said body structure, spring means operative to urge said member in a wedging direction, and means adjacent said end longitudinally spaced from said flange for urging a tensioned line engaged therewith laterally to adjacent a side face of the body structure.

5. In a line holder, the combination of a hollow body structure of sheet metal having a pair of side walls integrally connected by an end wall, said side walls having opposed inwardly extending flanges adjacent their lower edges, a longitudinally extending flange carried by one of said side walls at the upper edge thereof and extending inwardly therefrom adapted to engage a line positioned therebeneath, a wedge member positioned in said body structure, a pin carried by said body structure engageable with said wedge member for restricting movement of the latter longitudinally with respect to the body structure, said wedge member being of a length to be wedged between said opposed flanges and a line positioned beneath said longitudinally extending flange, whereby such a line is clamped to said body structure, an end wall carried by said body structure and having a convex upper edge over which a tensioned line may extend operative to urge a line engaged therewith laterally to adjacent a side face of the body structure, spring means extending between said last-mentioned end wall and said wedge member operative to urge the latter in a wedging direction, the opposite end wall having opposed ears thereon and means carried by said ears extending transversely with respect to the body structure constructed for engagement with a wall structure to support the holder therefrom.

6. In a line holder, the combination of a hollow body structure of sheet metal having a pair of side walls integrally connected by an end wall, said side walls having opposed inwardly extending flanges adjacent their lower edges, a longitudinally extending flange carried by one of said side walls at the upper edge thereof and extending inwardly therefrom adapted to engage a line positioned therebeneath, a wedge member positioned in said body structure, a pin carried by said body structure engageable with said wedge member for restricting movement of the latter longitudinally with respect to the body structure, said wedge member being of a length to be wedged between said opposed flanges and a line positioned beneath said longitudinally extending flange, whereby such a line is clamped to said body structure, an end wall carried by said body structure and having a convex upper edge over which a tensioned line may extend operative to urge a line engaged therewith laterally to adjacent a side face of the body structure, spring means extending between said last-mentioned end wall and said wedge member operative to urge the latter in a wedging direction, the opposite end wall having opposed ears thereon, means carried by said ears extending transversely with respect to the body structure constructed for engagement with a wall structure to support the holder therefrom, and a handle member operatively connected to said wedge member and extending downwardly therefrom for manually effecting disengagement of the wedge holder with such a line.

References Cited in the file of this patent

UNITED STATES PATENTS

| | | |
|---|---|---|
| 1,272,392 | Craven et al. | July 16, 1918 |
| 1,518,850 | Hume | Dec. 9, 1924 |
| 2,407,389 | Stevens | Sept. 10, 1946 |
| 2,505,935 | Batchler | May 2, 1950 |
| 2,585,160 | Munn | Feb. 12, 1952 |